Sept. 2, 1952 — W. J. ZIMMERSCHIED ET AL — 2,609,375
ALKYLATION OF THIOPHENE
Filed June 29, 1951
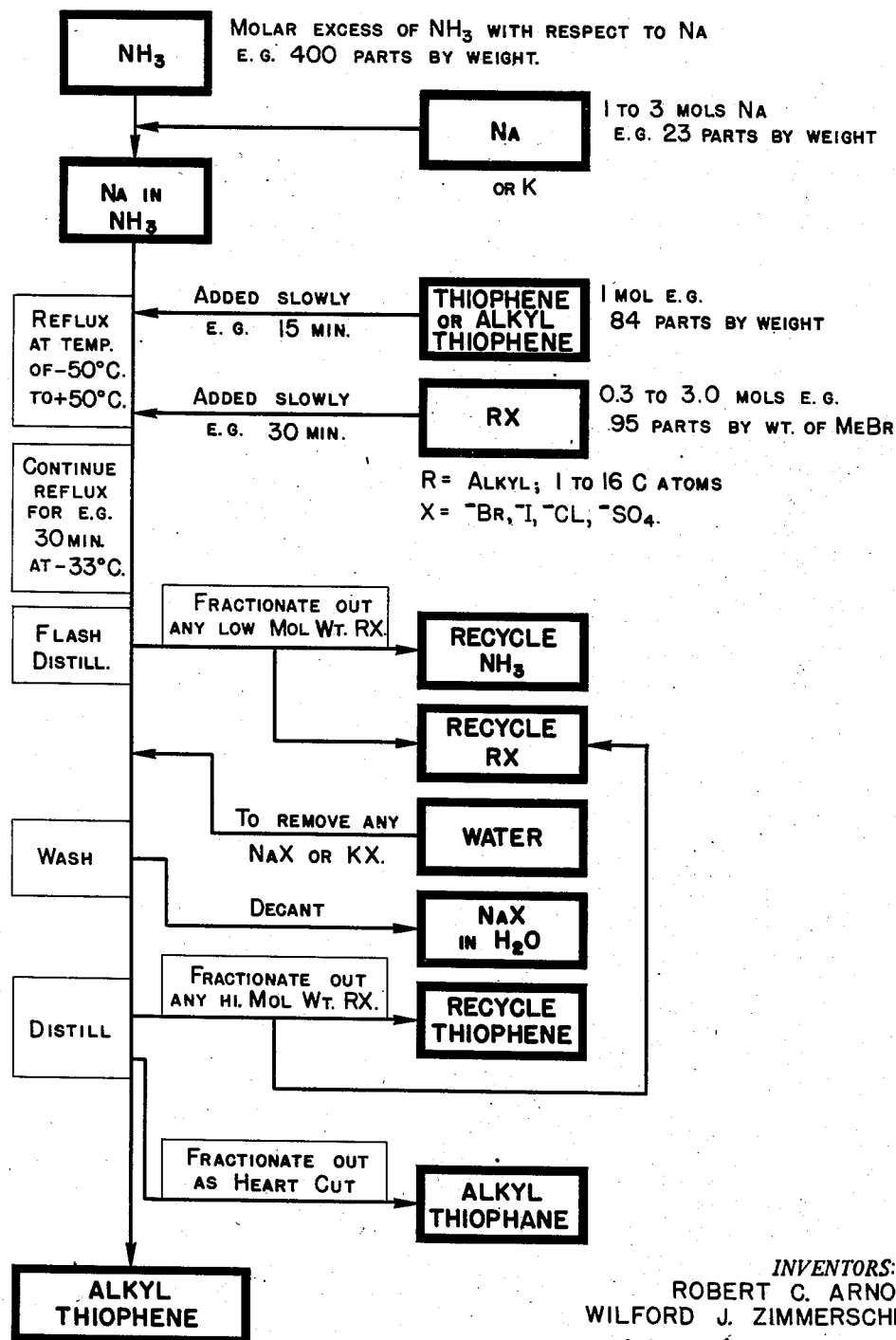
INVENTORS:
ROBERT C. ARNOLD
WILFORD J. ZIMMERSCHIED
BY: *Olive E. Williams*
ATTORNEY:

Patented Sept. 2, 1952

2,609,375

UNITED STATES PATENT OFFICE 2,609,375

ALKYLATION OF THIOPHENE

Wilford J. Zimmerschied, Hammond, Ind., and Robert C. Arnold, Park Forest, Ill., assignors to Standard Oil Company, Chicago, Ill., a corporation of Indiana Application June 29, 1951, Serial No. 234,421

7 Claims. (Cl. 260—329)

This invention relates to the preparation of alkyl derivatives of thiophene and has particular reference to a process of alkylating thiophene and homologs thereof having an unsubstituted alpha carbon atom.

This is a continuation-in-part of our copending application Ser. No. 179,966 filed August 17, 1950, now U. S. Patent 2,585,292 patented February 12, 1952. In the parent application a stepwise process is disclosed in which thiophene is mixed with an alkali metal amide dispersed in liquid ammonia to which an alkyl monohalide or sulfate is thereafter added to form an alkylated thiophene. In an example of the said application it was disclosed that when elemental sodium is employed instead of sodamide a highly contaminated product was obtained in contrast to the substantially pure alkylated thiophene recovered when sodamide was used.

A primary object of the present invention is the provision of a method for the preparation of both alkyl thiophenes and alkyl thiophanes in a single stepwise alkylation process. Another object of the invention is the preparation of substantially pure alkyl derivatives of thiophenes having one or two aliphatic radicals, each of which may contain from one to 16 carbon atoms. Yet another object of the invention is the provision of a process for preparing the said alkyl derivatives of thiophene and, in addition, alkyl derivatives of thiophane, and provision for separation of the said substituted thiophene and thiophane. Other objects of the invention will appear in the specification and claims hereinafter made.

Thiophene is to be found in the light oil from the destructive distillation of coal, and has been prepared by synthesis from acetylene and a sulfur compound, and by cyclizing butyl mercaptan; it is also recovered from various petroleum fractions or products of petroleum reforming processes. The last mentioned source continues to provide an increasing supply of thiophene as an increasing number of processes for separating sulfur compounds from petroleum products are employed. The alkyl derivatives of thiophene and thiophane, which at present are useful as drugs or dyes either directly or as intermediates, have a wide potential usefulness. The provision of long chain alkyl thiophenes supplies a source of intermediates for synthesis of detergents and wetting agents.

We now have discovered that when an alkali metal is used instead of an alkali metal amide in the hereinbefore described process of our Ser. No. 179,966, not only is the said alkylated thiophene formed but there is also obtainable a substantial yield of alkylated thiophane. We have found that these products are separable by distillation. The alkyl radical of the alkylating agent, which is an alkyl mono-halide or sulfate, can have from one to 16 carbon atoms, the latter number being substantially the number of carbon atoms that can be present in the alkylating agent of highest molecular weight that is soluble in liquid ammonia at maximum operating temperatures. The alkali metal can be added directly to the reaction mixture as such or it can be minutely dispersed in liquid ammonia prior to its admixture with other reactants. The elemental alkali metal must be added to the thiophene and the liquid ammonia before the addition of the alkylating agent in order to avoid extremely low yields of alkyl thiophene.

Reaction is carried out in liquid phase, consequently the pressure employed must be at least such as to maintain ammonia in a boiling condition at the reaction temperature employed. The reaction temperature can vary between $-50°$ and $+50°$ C. and preferably between $-50°$ and $+25°$ C. At atmospheric pressure, the most practicable temperature is $-33°$ C., i. e. the boiling point of ammonia.

After reaction, the ammonia is separated from the unconverted reactants and product, the mixture of reactants and product is washed with water to remove alkali-metal halide or sulfate, and finally, the products are separated from the unconverted reactants by distillation. The produced alkyl thiophene and alkyl thiophane are separated by fractional distillation. The product will contain a predominant proportion of the alkyl thiophene having an alkyl radical corresponding to that of the alkylating agent employed in the synthesis.

A surprising result of the process of the copending application was observed to be the fact that the alkyl thiophene which is produced by the process is substantially only the alpha monoisomer. It was further noted that this result is unexpected in view of the fact that the process is an instance of base-catalyzed alkylation from which the beta isomer formation is more to be expected. An equally surprising result is observed when the present process, employing elemental alkali metal, is employed. Here again the thiophene product is substantially entirely the alpha mono-isomer and is apparently substantially uncontaminated by any other isomers.

Our process of preparing alpha alkyl thiophenes and thiophanes employs as a feed stock a thiophene having at least one unsubstituted alpha carbon atom and does not include other organic compounds to be found in petroleum fractions, as, for example, alkylated mercaptans or sulfides. Of the alkyl halides the alkylation can be performed only with a mono-halide. Alkyl di-halides will not react with the thiophene under those conditions that result in effective alkylation when a mono-halide is employed.

In the accompanying drawing the single figure diagrammatically represents a preferred embodiment of the process of the present invention and illustrates certain quantity relationships in the process.

According to the present invention and with reference to the drawing, elemental sodium is added to a molar excess of liquid ammonia. Thereafter thiophene is added to the dispersion of sodium in the liquid ammonia. The thiophene, usually being warmer than the ammonia medium, is preferably slowly added to the liquid ammonia for purposes of temperature control. A ratio of approximately 1 to 3 mols of sodium per mol of thiophene is maintained.

An alkyl mono-halide or mono-sulfate in which the alkyl group has from 1 to 16 carbon atoms per molecule is added to the reaction mixture in a proportion from about 0.3 to 3 mols of the alkylating agent per mol of thiophene and during said addition the mixture is maintained at a temperature between about $-50°$ and $+25°$ C. One method of carrying out the reaction is to operate under reflux conditions while varying the pressure so as to cause the reaction mixture to reflux at a preferred operating temperature. The alkylating agent is preferably added to the liquid ammonia, alkali metal and thiophene after the addition of the latter. The alkylating agent can also be added to the ammonia and alkali metal in admixture with the thiophene. On the other hand, that order of addition which consists of the introduction of alkali metal after the admixture of the other reactants greatly reduces the obtainable yields.

The alkylating agent is preferably added slowly also in order to avoid disturbing the uniform temperature control. Refluxing of the reaction mixture is continued at the selected temperature until substantial completion of reaction is accomplished. After the slow admixture of reactants is completed, the alkylation reaction will continue at a rate dependent upon the reaction temperature and, to some extent, the degree of mixing. The alkylation can therefore be accomplished in a few minutes to a few hours and preferably in a period from about ten minutes to one hour.

After completion of reaction, ammonia is separated from the product preferably by a flash distillation. In those instances where a low molecular weight alkylating agent is employed, any excesses thereof can be distilled from the reaction product along with the ammonia and can be recovered as a separate fraction from the effluent ammonia. This recovered ammonia, substantially free of alkyl halide or sulfide, is returned to the initial step of the process. The flash distilled product is preferably water washed to remove alkali metal halide or sulfate, a by-product of the reaction. The water washed product is fractionally distilled to remove therefrom unreacted thiophene. This separated thiophene will also contain unreacted alkylating agent when higher molecular weight alkylating agents are employed. In such instances the alkylating agent is fractionally distilled from the said thiophene and can be recycled to the process.

The product will consist of mixed alkyl thiophene and alkyl thiophane. This product is fractionally distilled, preferably under a vacuum, to separate the alkyl thiophene and the alkyl thiophane. The alkyl thiophane usually constitutes less than one-quarter of the volume of recovered alkyl thiophene. The alkyl thiophenes boil at approximately 20° C. higher than the alkyl thiophanes at standard pressures. For example, 2-methyl thiophene and 2-methyl thiophane have boiling points of, respectively, 111° and 133° C.

An alkyl thiophene having at least one unsubstituted alpha carbon atom can be employed in place of thiophene in the process. In such instances the products will be a poly-alkyl thiophene and a poly-alkyl thiophane in which the so-added alkyl chain is attached to an alpha carbon atom.

In the following specific examples thiophene in liquid ammonia is alkylated by various alkylating agents in the presence of elemental sodium.

*Example I*

In this example elemental sodium and methyl bromide vapor were employed as alkylating agents.

There were dissolved in about 750 ml. of liquid ammonia maintained at reflux temperature 2 gram mols, or 46 grams, of metallic sodium. One gram mol, or 84 grams, of thiophene was then slowly added to the reaction mixture from a dropping funnel over a period of 30 minutes. Methyl bromide was vaporized and 1 gram mol, or 95 grams, of methyl bromide vapor was introduced into the refluxing reaction mixture over a period of 1½ hours. At the completion of this period, the reaction mass was washed with water and a product layer was decanted from the washed mixture. The product was thereafter washed with dilute hydrochloric acid, dried, distilled, and thereafter refractionated. The total product constituted a 54% theoretical conversion to alkylated material and had the following composition:

| | Per cent |
|---|---|
| 2-methyl thiophene | 66 |
| 2-methyl thiophane | 29 |
| Dimethyl thiophene | 5 |

*Example II*

In this example an attempt was made to alkylate thiophene with a catalytic quantity of sodamide in order to eliminate the possibility that elemental alkali metal is not the actual catalyst for the alkylation herein described but that some minute amount of alkali-metal amide forms by reaction of the metal with ammonia and that this small amount of the amide catalyzes the reaction.

In this example, only 0.1 gram mol of sodamide was added to about 750 ml. of liquid ammonia maintained at reflux temperature. About 1 mol of thiophene was then added to the ammonia and subsequently methyl bromide was slowly added thereto. Only 2% of the theoretical yield of alkylated products were obtained.

*Example III*

In this example butyl bromide and elemental sodium were used as the alkylating agents.

Two gram mols of elemental sodium were stirred into liquid ammonia to which was subsequently added 2 gram mols of thiophene and then 2 gram mols of butyl bromide. A theoretical yield of 44% of 2-butyl thiophene, boiling in the range of 180° to 182° C., was obtained. The butyl thiophene was separated by fractional distillation from unreacted thiophene and a bottoms product that comprised 2-butyl thiophane.

*Example IV*

In this example the effect of the order of addition of reactants upon the yield of alkylated product was examined. To 800 ml. of liquid ammonia maintained at reflux temperature there was added 1 gram mol of thiophene and subsequently 1 gram mol of ethyl bromide. To this mixture there was subsequently added, very slowly, 1 gram mol of elemental sodium. The yield of alkylated product obtained was only 5% of theoretical.

*Example V*

In this example ethyl bromide and elemental sodium were employed as alkylating agents.

Two mols of elemental sodium were dissolved in liquid ammonia and 1 gram mol of thiophene was then added to the solution while maintaining the liquid ammonia at reflux temperature. Subsequently 1 mol of ethyl bromide was added to the reaction mixture. Refluxing was continued for a period of 45 minutes to effect alkylation of the thiophene with the ethyl bromide. Unreacted thiophene was removed by distillation. The water washed material was fractionated and yielded in addition to 2-ethyl thiophene about 11 grams of 2-ethyl thiophane. An attempt was made to reduce the 2-ethyl thiophene to 2-ethyl thiophane, and thus increase the yield of the latter, by adding 50 grams of anhydrous methanol to the reaction mixture thus to provide hydrogen, intermediately, for the reduction of the 2-ethyl thiophene to 2-ethyl thiophane. No effect on the reaction could be observed.

*Example VI*

In this example the alkylated products were fractionally distilled and many fractions were separated; these fractions were identified by mass spectrometer. The products were also identified by determination of refractive index and boiling point.

Two mols of elemental sodium were dissolved in about 800 ml. of ammonia maintained at reflux temperature. Two gram mols of thiophene, then slowly, 2 gram mols of ethyl bromide, were added to the solution. The product was refluxed for a period of 45 minutes. After water washing and neutralization of the product, it was fractionally distilled and the fractions were identified, the following product distribution being obtained:

31.5% unreacted thiophene
6.5% diethyl sulfide
35.0% 2-ethyl thiophene
8.3% 2-ethyl thiophane
9.8% diethyl thiophene and unknown products When the alkyl thiophene and thiophane that are prepared have relatively low molecular weights a preferred method of separating the products may be as follows rather than as shown in the drawing. The product is flash-distilled for removal of ammonia, a high vacuum is then imposed on the system, unreacted thiophene is distilled off, and then alkyl thiophane and alkyl thiophene are fractionated from the reaction product, leaving salt in the resultant bottoms.

As previously stated, the products of this process are useful as dyes, drugs and detergents or as intermediates therefor. The process is also useful in providing the desulfurization of mixtures that contain thiophene or alkyl thiophene, especially when the thiophene is difficultly separable therefrom by distillation. An example of this is the desulfurization of benzene containing thiophene. While thiophene is difficult to separate from benzene by distillation, alkylated thiophene is readily separable.

Having described our invention, we claim:

1. A process of preparing an alpha alkyl thiophene comprising providing a dispersion of an alkali metal in liquid ammonia, admixing therewith a compound selected from the group consisting of thiophene and alkyl homologs thereof having at least one unsubstituted alpha carbon atom, thereafter introducing an alkylating agent having an alkyl radical of at most 16 carbon atoms per molecule and being selected from the group consisting of alkyl iodide, alkyl bromide, alkyl chloride and alkyl sulfate, maintaining the liquid ammonia and admixed components at a temperature between about $-50°$ and $+50°$ C. to effect reaction therebetween, and recovering an alpha alkyl thiophene from the reaction mixture.

2. The process of claim 1 in which the alkali metal is sodium.

3. The process of claim 1 in which the alkali metal is potassium.

4. The process of claim 1 in which the alkylating agent is an alkyl halide in which the alkyl radical has at most 16 carbon atoms.

5. The process of claim 1 in which the alkylating agent is an alkyl sulfate in which each alkyl radical has at most 16 carbon atoms.

6. A process of preparing an alpha mono-alkyl thiophene and a minor amount, as a separate product, of a corresponding alkyl thiophane, comprising the steps of dispersing an elemental alkali metal in a molar excess of liquid ammonia, adding to the ammonia from ⅓ to 1 mol of thiophene, per mol of alkali metal, refluxing the said liquid ammonia and the added components at a temperature between $-50°$ and $+50°$ C., during said refluxing step introducing an alkylating agent having an alkyl radical that has at most 16 carbon atoms per molecule and is selected from the group consisting of alkyl iodide, alkyl bromide, alkyl chloride and alkyl sulfate, continuing said refluxing of the admixture for a period sufficient to effect reaction between the said thiophene and the alkylating agent, flash distilling ammonia from the reaction mass, water washing the flash distilled product to remove alkali metal salts therefrom, fractionating the water-washed product to remove unreacted thiophene and separate thereby an alpha alkyl thiophene, and distilling from the bottoms product of the said fractionation a corresponding alkyl thiophane.

7. A process of preparing an alpha monoalkyl thiophene and a minor amount, as a separate product, of a corresponding alkyl thiophane, comprising the steps of dispersing an elemental alkali metal in liquid ammonia, adding to the ammonia from ⅓ to 1 mol of thiophene, per mol of alkali metal, refluxing the said liquid ammonia and the added components at a temperature between $-50°$ and $+50°$ C., during said refluxing step introducing an alkylating agent comprising essentially an alkyl halide having at most 16 carbon atoms per molecule, continuing said refluxing of the admixture for a period between about ten minutes and one hour that is sufficient to effect reaction between the said thiophene and the alkyl halide, flash distilling ammonia from the reaction mass, water washing the flash distilled product to remove alkali metal halide therefrom, fractionating the water washed product to separate as distillate fractions unreacted thiophene and an alpha alkyl thiophene, and distilling from the bottoms product of the said fractionation a corresponding alkyl thiophane.

WILFORD J. ZIMMERSCHIED.
ROBERT C. ARNOLD.

No references cited.